United States Patent
Liu et al.

(10) Patent No.: US 11,801,709 B2
(45) Date of Patent: *Oct. 31, 2023

(54) COMPOSITE WHEEL AND ASSEMBLING DEVICE THEREOF

(71) Applicant: CITIC Dicastal CO., LTD., Hebei (CN)

(72) Inventors: Weidong Liu, Qinhuangdao (CN); Minglei Li, Qinhuangdao (CN); Dexi Du, Qinhuangdao (CN)

(73) Assignee: CITIC DICASTAL CO., LTD., Hebei (CN)

( * ) Notice: Subject to any disclaimer, the term of this patent is extended or adjusted under 35 U.S.C. 154(b) by 943 days.

This patent is subject to a terminal disclaimer.

(21) Appl. No.: 16/713,651

(22) Filed: Dec. 13, 2019

(65) Prior Publication Data

US 2020/0406673 A1 Dec. 31, 2020

(30) Foreign Application Priority Data

Jun. 27, 2019 (CN) .......................... 201910565606.2

(51) Int. Cl.
*B60B 5/02* (2006.01)
*B60B 21/06* (2006.01)

(52) U.S. Cl.
CPC .............. *B60B 5/02* (2013.01); *B60B 21/066* (2013.01); *B60B 2360/3416* (2013.01); *B60B 2900/111* (2013.01); *B60B 2900/311* (2013.01); *B60B 2900/572* (2013.01)

(58) Field of Classification Search
CPC . B60B 5/02; B60B 21/066; B60B 2360/3416; B60B 2900/111; B60B 2900/311; B60B 2900/572; B60B 1/0261; B60B 1/042; B60B 1/043; B60B 1/044; B60B 1/045; B60B 1/046; B60B 1/047; B60B 1/048

See application file for complete search history.

(56) References Cited

U.S. PATENT DOCUMENTS

| 249,166 | A | * | 11/1881 | Fielding | .................. B60B 1/042 |
| | | | | | 301/59 |
| 430,687 | A | * | 6/1890 | Reinhold | ................ B60B 1/042 |
| | | | | | 301/59 |
| 520,845 | A | * | 6/1894 | Fay | ......................... B60B 1/042 |
| | | | | | 301/55 |

(Continued)

FOREIGN PATENT DOCUMENTS

| EP | 1310383 A2 | 5/2003 | |
| FR | 2745232 A1 | * 8/1997 | ............. B60B 1/041 |
| WO | 2011140826 A1 | 11/2011 | |

OTHER PUBLICATIONS

Machine Translation of FR 2745232 A1, 5 pages (Year: 1997).*
European Search Report in the European application No. 19219873.7, dated May 18, 2020, 7 pgs.

*Primary Examiner* — S. Joseph Morano
*Assistant Examiner* — Emily G. Castonguay
(74) *Attorney, Agent, or Firm* — Cooper Legal Group, LLC

(57) ABSTRACT

A composite wheel includes a rim, a connecting ring, a plurality of spokes and a flange all connected in sequence from the outside to the inside. One end of each spoke is provided with a thread, and the other end of each spoke is provided with a first mounting hole.

4 Claims, 9 Drawing Sheets

(56) References Cited

U.S. PATENT DOCUMENTS

| | | | |
|---|---|---|---|
| 556,124 A * | 3/1896 | Wolff | B60B 21/062 |
| | | | 301/58 |
| 11,305,577 B2 * | 4/2022 | Liu | B60B 1/042 |
| 2001/0054840 A1 * | 12/2001 | Schlanger | B60B 1/003 |
| | | | 301/59 |
| 2003/0085610 A1 | 5/2003 | Addink | |
| 2004/0130204 A1 | 7/2004 | Schlanger | |
| 2004/0155518 A1 | 8/2004 | Schlanger | |
| 2010/0264722 A1 | 10/2010 | Teixeira, IV | |
| 2014/0239703 A1 * | 8/2014 | Walthert | B60B 1/041 |
| | | | 301/58 |

* cited by examiner

COMPOSITE WHEEL AND ASSEMBLING DEVICE THEREOF

CROSS-REFERENCE TO RELATED APPLICATION

The present application claims benefit of Chinese Patent Application No. 201910565606.2, filed on Jun. 27, 2019, the contents of which are hereby incorporated by reference in their entirety.

BACKGROUND

Composite wheels are now becoming increasingly popular among young consumers. As an important safety component in an automobile, various performance indexes of wheels are important factors that restrict the development of composite wheels. Among them, the run-out value is a 100% inspection item of wheels. How to ensure that the overall run-out value is qualified after the composite wheels are assembled is a difficult problem which needs to be solved by wheel manufacturers.

SUMMARY

The disclosure relates to the technical field of wheels, in particular to a composite wheel assembling device.

In view of the above, the present disclosure aims to provide a composite wheel and an assembling device thereof, which have the characteristics of good wheel assembling precision, simple structure, convenient manufacture, and stable performance.

In order to achieve the above object, the technical scheme of the disclosure is realized as follows:

a composite wheel includes a rim, a connecting ring, a plurality of spokes and a flange which are connected in sequence from an outside to an inside in a radial direction of the composite wheel, wherein one end of each spoke of the plurality of spokes is provided with a thread, and another end of each spoke is provided with a first mounting hole, two ring grooves capable of accommodating the first mounting holes are provided in positions adjacent to a first axial surface and a second axial surface and on a radial side surface of the flange; threaded holes penetrating through the two ring grooves are uniformly provided in the first axial surface and the second axial surface of the flange corresponding to the ring grooves, and multiple first mounting holes are inserted into the two ring grooves and connected by bolts passing through the first mounting holes and matching with the threaded holes;

a radial side surface of the connecting ring is uniformly provided with a plurality of through stepped second mounting holes, a radial outside hole diameter of each of the plurality of through stepped second mounting holes is larger than a radial inside hole diameter of each of the plurality of through stepped second mounting holes, a cylinder sleeve is pressed in the plurality of through stepped second mounting holes from an outside to an inside in a radial direction of the connecting ring, the cylinder sleeve is provided with an inner hole spherical surface and a cylindrical surface from an outside to an inside in a radial direction of the cylinder sleeve, the cylinder sleeve is further inserted with a locking sleeve, and the locking sleeve includes a side wall spherical surface, an outer cylindrical surface and a threaded hole, wherein a radial outer side of the side wall spherical surface is matched with the inner hole spherical surface, the outer cylindrical surface is matched with the cylindrical surface, and the threaded hole is on a radial inside of the locking sleeve and matched with the thread of each spoke of the plurality of spokes;

and the rim is fixedly connected to a radial outside of the connection ring.

A composite wheel assembling device includes a frame, characterized in that: an oil cylinder is fixed on the frame; an oil cylinder rod of the oil cylinder penetrates through a base fixed on the frame, a first end is fixedly connected with at least three mounting frames uniformly arranged in a circumferential direction; rollers are hinged on the at least three mounting frames through mounting shafts; a bracket is hinged at a position corresponding to each roller of the rollers and on the base; a top of each bracket is provided with an arc-shaped inclined plane, wherein the arc-shaped inclined plane is matched with a corresponding roller of the rollers, a height of the arc-shaped inclined plane gradually reduces from an outside to an inside; a radial outer side surface of each bracket is provided with a contact, and at least three uniformly arranged contacts can be driven by the oil cylinder rod to tighten and loosen a central hole of a flange placed on the frame and passes through the bracket.

Compared with the prior art, the composite wheel assembling device has the following advantages that:

the composite wheel according to the present disclosure has the advantages of high size and shape precision, good dynamic balance, high fatigue strength, good rigidity and elasticity, light weight, attractive appearance and recyclable materials.

The composite wheel assembling device according to the present disclosure meets the requirement of high-precision wheel assembling, meanwhile, has the characteristics of simple structure, convenience in manufacturing and stable performance.

BRIEF DESCRIPTION OF DRAWINGS

The accompanying drawings forming a part of the present disclosure are used to provide a further understanding of the present disclosure, and the schematic embodiments and the descriptions of the present disclosure serve to explain the present disclosure and do not constitute an improper limitation of the present disclosure. In the drawings.

LIST OF REFERENCE SYMBOLS

Figure 1:
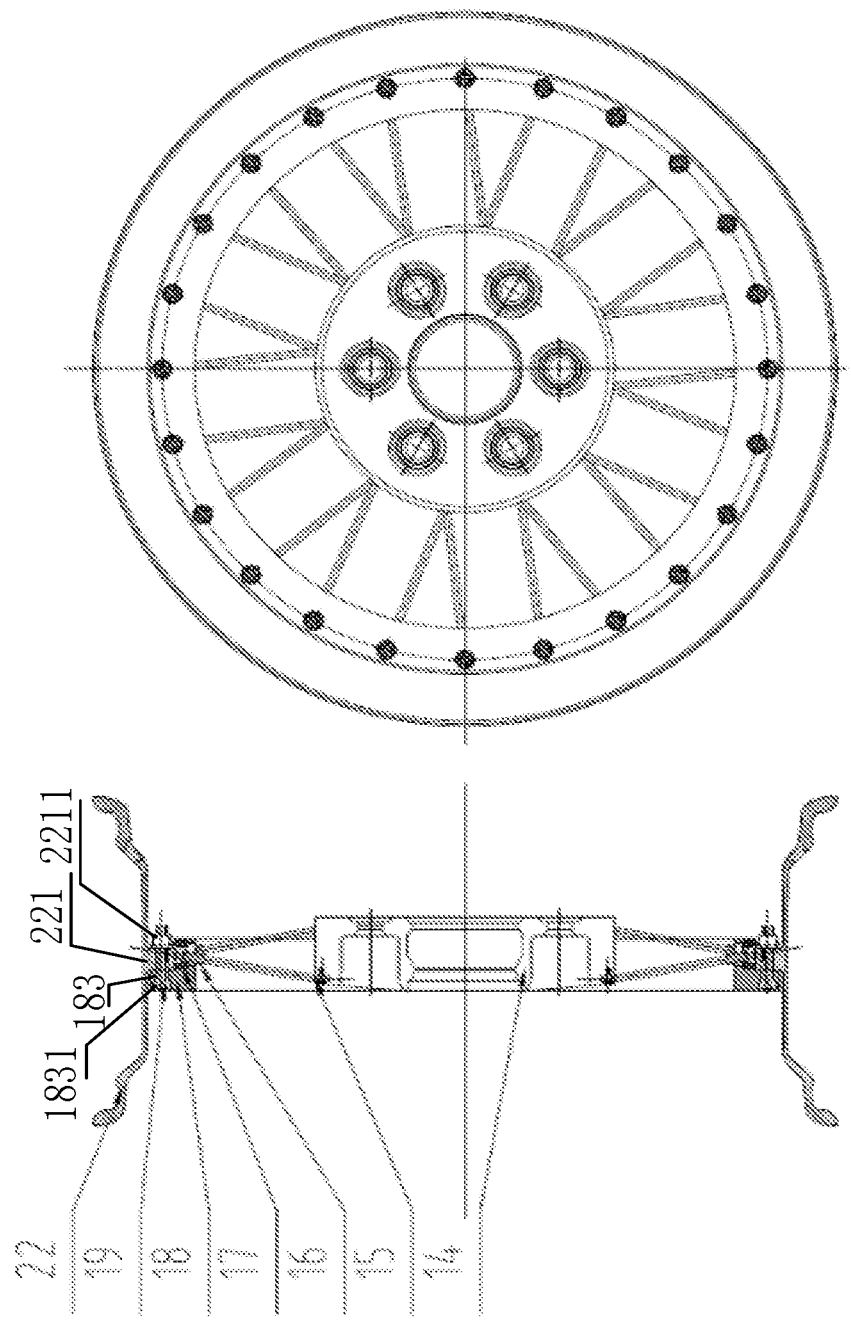
FIG. 1 is a schematic structural view of the composite wheel according to the present disclosure.
Figure 2:
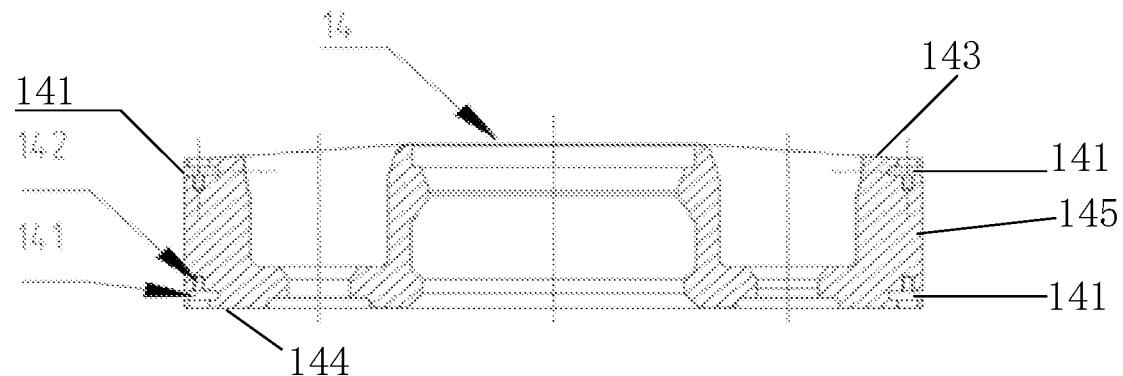
FIG. 2 is a schematic structural view of the flange of the composite wheel according to the present disclosure.
Figure 3:
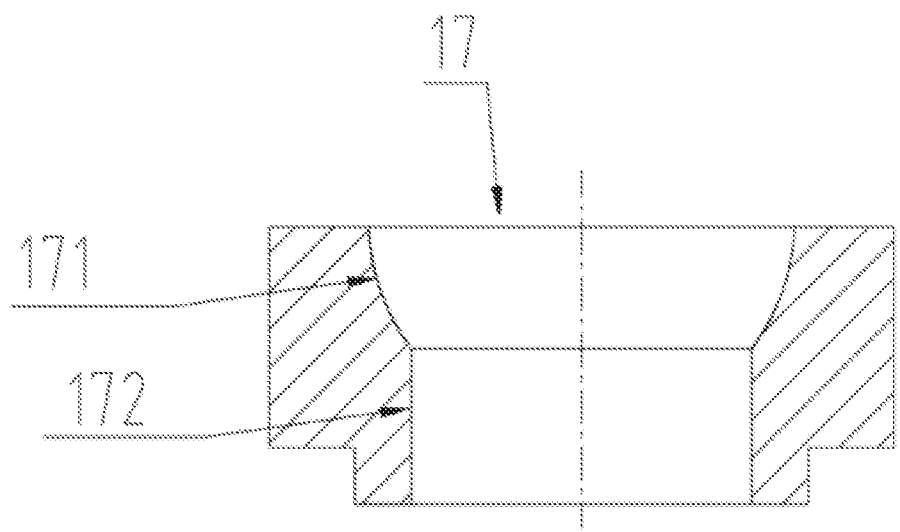
FIG. 3 is a schematic structural view of the cylinder sleeve of the composite wheel according to the present disclosure.
Figure 4:
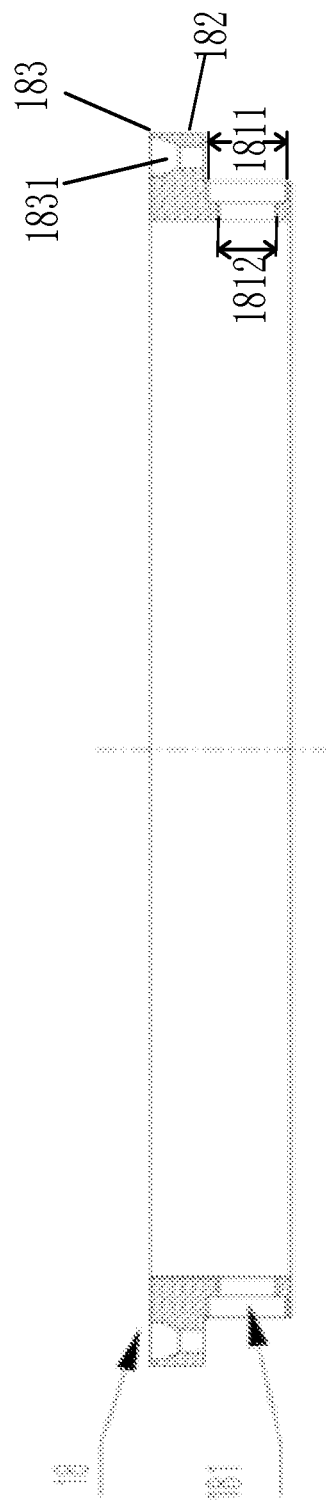
FIG. 4 is a schematic structural view of the connecting ring of the composite wheel according to the present disclosure.
Figure 5:
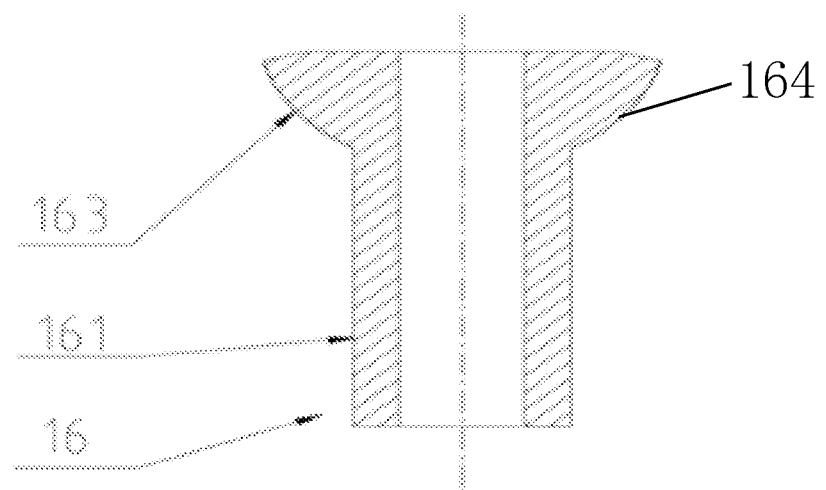
FIG. 5 is a schematic view of the locking sleeve of the composite wheel according to the present disclosure.
Figure 6:
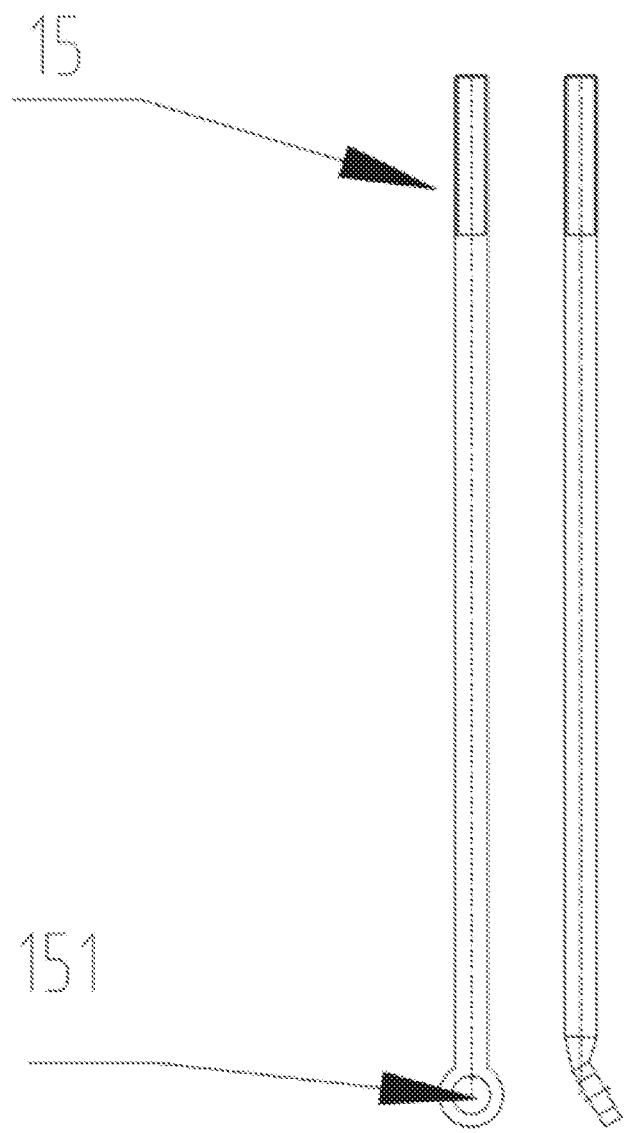
FIG. 6 is a schematic structural view of the titanium alloy spoke of the composite wheel according to the present disclosure.

1—oil cylinder, 2—chassis, 3—oil cylinder rod, 4—base, 5—pin shaft, 6—bracket, 7—protection, 8—mounting frame, 9—mounting shaft, 10—contact, 11—roller, 12—elastic belt, 13—copper sleeve, 14—flange, 141—ring groove, 142—threaded hole, 15—spoke, 151—first mounting hole, 16—locking sleeve, 161—outer cylindrical surface, 163—side wall spherical surface, 17—cylinder sleeve, 171—inner hole spherical surface, 172—cylindrical surface, 18—connecting ring, 181—second mounting hole, 19—bolt, 20—positioning ring, 21—frame, 22—rim; 143—first axial surface, 144—second axial surface, 145—radial outer side surface of the flange; 182—radial side surface of the connecting ring, 1811—radial outside hole diameter, 1812—radial inside hole diameter; 164—radial outer side of the side wall spherical surface; 183—first annular protrusion, 1831—axial threaded through holes; 221—second protrusion; 2211—axial threaded through holes.

DETAILED DESCRIPTION

It should be noted that the embodiments and the features in the embodiments of the present disclosure may be combined with each other without conflict.

The technical solution of the present disclosure will be described more clearly and completely with reference to the accompanying drawings in conjunction with the embodiments, and it is apparent that the described embodiments are only some but not all embodiments of the present disclosure. All other embodiments which can be obtained by a person with ordinary skill in the art without making any creative work based on the embodiments of the present disclosure belong to the claimed scope of the present disclosure.

According to a first aspect of embodiments of the present disclosure, there is provided a method a composite wheel including a rim, a connecting ring, a plurality of spokes and a flange which are connected in sequence from an outside to an inside in a radial direction of the composite wheel, one end of each spoke of the plurality of spokes is provided with a thread, and another end of each spoke of the plurality of spokes is provided with a first mounting hole, two ring grooves capable of accommodating the first mounting holes are provided in positions adjacent to a first axial surface and a second axial surface and on a radial outer side surface of the flange; threaded holes penetrating through the two ring grooves are uniformly provided in the first axial surface and the second axial surface of the flange corresponding to the two ring grooves, and multiple first mounting holes are inserted into the two ring grooves and connected by bolts passing through the first mounting holes and matching with the threaded holes;

a radial side surface of the connecting ring is uniformly provided with a plurality of through stepped second mounting holes, a radial outside hole diameter of each of the plurality of through stepped second mounting holes is larger than a radial inside hole diameter of each of the plurality of through stepped second mounting holes, a cylinder sleeve is pressed in the plurality of through stepped second mounting holes from an outside to an inside in a radial direction of the connecting ring, the cylinder sleeve is provided with an inner hole spherical surface and a cylindrical surface from an outside to an inside in a radial direction of the cylinder sleeve, the cylinder sleeve is further inserted with a locking sleeve, and the locking sleeve includes a side wall spherical surface, an outer cylindrical surface and a threaded hole, wherein a radial outer side of the side wall spherical surface is matched with the inner hole spherical surface, the outer cylindrical surface is matched with the cylindrical surface, and the threaded hole is on a radial inside of the locking sleeve and matched with the thread of each spoke of the plurality of spokes;

and the rim is fixedly connected to a radial outside of the connection ring.

In one embodiment, the radial side surface of the connecting ring is further provided with a first annular protrusion, and a second protrusion corresponding to the first annular protrusion is provided on the radial inner side surface of the rim, wherein the first annular protrusion and the second protrusion are both provided with axial threaded through holes and are fixedly connected through a bolt.

In one embodiment, the threaded holes are symmetrically disposed on both the first axial surface and the second axial surface of the flange.

In one embodiment, the material of the rim includes carbon fibers and the material of the plurality of spokes includes a titanium alloy.

According to a second aspect of embodiments of the present disclosure, there is provided a composite wheel assembling device including a frame, characterized in that: an oil cylinder is fixed on the frame; an oil cylinder rod of the oil cylinder penetrates through a base fixed on the frame, a first end is fixedly connected with at least three mounting frames uniformly arranged in the circumferential direction; rollers are hinged on the at least three mounting frames through mounting shafts; a bracket is hinged at the position corresponding to each roller of the rollers and on the base; the top of each bracket is provided with an arc-shaped inclined plane, wherein the arc-shaped inclined plane is matched with the corresponding roller of the rollers, the height of the arc-shaped inclined plane gradually reduces from the outside to the inside; the radial outer side surface of each bracket is provided with a contact, and at least three uniformly arranged contacts can be driven by the oil cylinder rod to tighten and loosen the central hole of the flange placed on the frame and passes through the bracket.

In one embodiment, an elastic belt is further included, the elastic belt tightening the at least three uniformly arranged brackets inwards so that the at least three uniformly arranged brackets are contacted with the rollers, and the elastic belt being arranged in grooves in the radial outer side surfaces of each of the at least three uniformly arranged brackets.

In one embodiment, a chassis is fixed on the frame, wherein the oil cylinder and the base are both fixed on the chassis.

In one embodiment, the positioning ring is mounted on the chassis, the coaxiality of the positioning ring and the oil cylinder rod is less than 0.05 mm.

In one embodiment, a protection is fixed to the top of the oil cylinder rod. A composite wheel assembling device according to an embodiment of the present disclosure will now be described with reference to FIGS. 1-6 in conjunction with the embodiment.

A composite wheel includes a rim 22, a connecting ring 18, a plurality of spokes 15 and a flange 14 which are connected in sequence from the outside to the inside in a radial direction of the composite wheel, wherein one end of each spoke 15 is provided with a thread, and the other end of each spoke 15 is provided with a first mounting hole 151.

Two ring grooves 141 capable of accommodating the first mounting holes 151 are provided in positions close to the first radial surface 143 and the second axial surface 144 and on the radial outer side surface 145 of the flange 14; threaded holes 142 penetrating through the ring grooves 141 are uniformly provided in the first radial surface 143 and the second axial surface 144 of the flange 14 corresponding to the ring grooves 141, and the multiple first mounting holes 151 are inserted into the ring grooves 141 and connected by the bolts passing through the first mounting holes 151 and matching with the threaded holes 142.

The radial side surface 182 of the connecting ring 18 is uniformly provided with a plurality of through stepped second mounting holes 181, the radial outside hole diameter 1811 of each second mounting hole 181 is larger than the radial inside hole diameter 1812 thereof, a cylinder sleeve 17 is pressed in the second mounting holes 181 from the outside to the inside in a radial direction of the connecting ring 18 and can be fixedly mounted in a pressing-in mode, the cylinder sleeve 17 is provided with an inner hole spherical surface 171 and a cylindrical surface 172 from the outside to the inside in a radial direction of the cylinder sleeve 17, the cylinder sleeve 17 is further inserted with a locking sleeve 16, and the locking sleeve 16 includes a side wall spherical surface 163, an outer cylindrical surface 161 and an threaded hole, wherein the radial outer side 164 of the side wall spherical surface 163 is matched with the inner hole spherical surface 171, the outer cylindrical surface 161 is matched with the cylindrical surface 172, and the threaded hole is on the radial inside of the locking sleeve 16 and matched with the thread of each spoke 15; the outer cylindrical surface 161 of the lower side wall of the locking sleeve 16 can be matched with the cylindrical surface 172 of the cylinder sleeve 17, and the tightness of the spokes 15 can be adjusted by rotating the locking sleeve 16 through a special tool. The connection ring 18 and the carbon fiber rim 22 are connected to be integral.

Bolts 19 fixedly connect rim 22 to the outside of connecting ring 18.

The flange 14 and the spokes 15 are connected through the annular groove 141, and the spokes 15 have the freedom degree of circumferential movement in the annular groove 141, so that the assembly difficulty and the processing cost of the spokes 15 are effectively reduced.

Through the matching between the inner hole spherical surface 171 of the cylinder sleeve 17 and the side wall spherical surface 163 of the locking sleeve 16, the locking sleeve 16 and the spokes 15 can rotate around the spherical center of the cylinder sleeve 17 within a certain range, and the structure can realize the spatial arrangement between the spokes 15, thereby meeting the requirements on the strength, the beauty and the like of the wheel.

In one embodiment, the radial side surface 182 of the connecting ring 18 is further provided with a first annular protrusion 183, and a second protrusion 221 corresponding to the first protrusion is provided on the radial inner side surface of the rim 22, wherein the first protrusion 183 and the second protrusion 221 are both provided with axial threaded through holes 1831/2211 and are fixedly connected through a bolt.

In one embodiment, the threaded holes 142 are symmetrically disposed on both the first axial surface 143 and second axial surface 144 of the flange 14.

In one embodiment, the material of the rim 22 includes carbon fibers and the material of the spokes 15 includes a titanium alloy.

Figure 7:
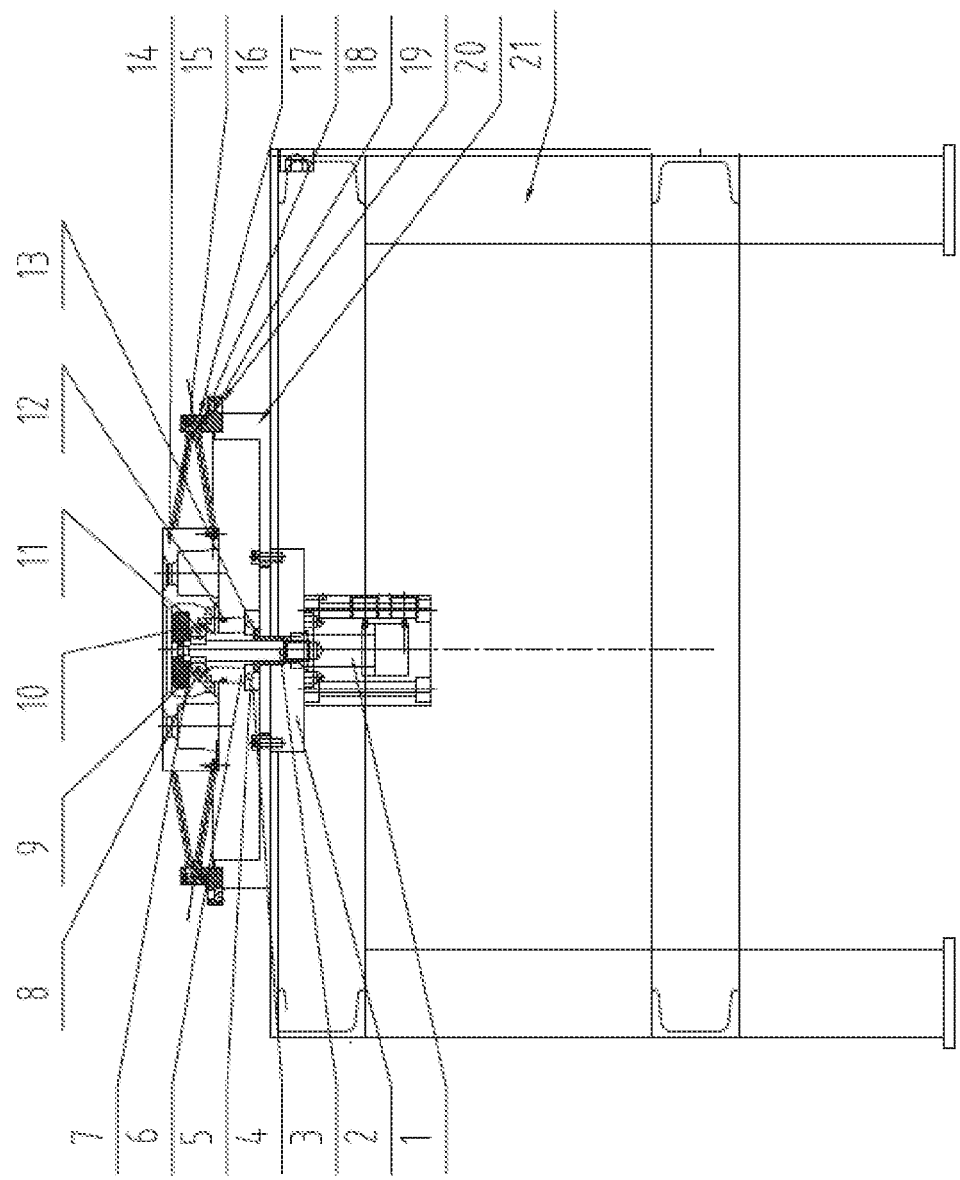
FIG. 7 is a schematic structural view of the composite wheel assembling device according to the present disclosure.
Figure 8:
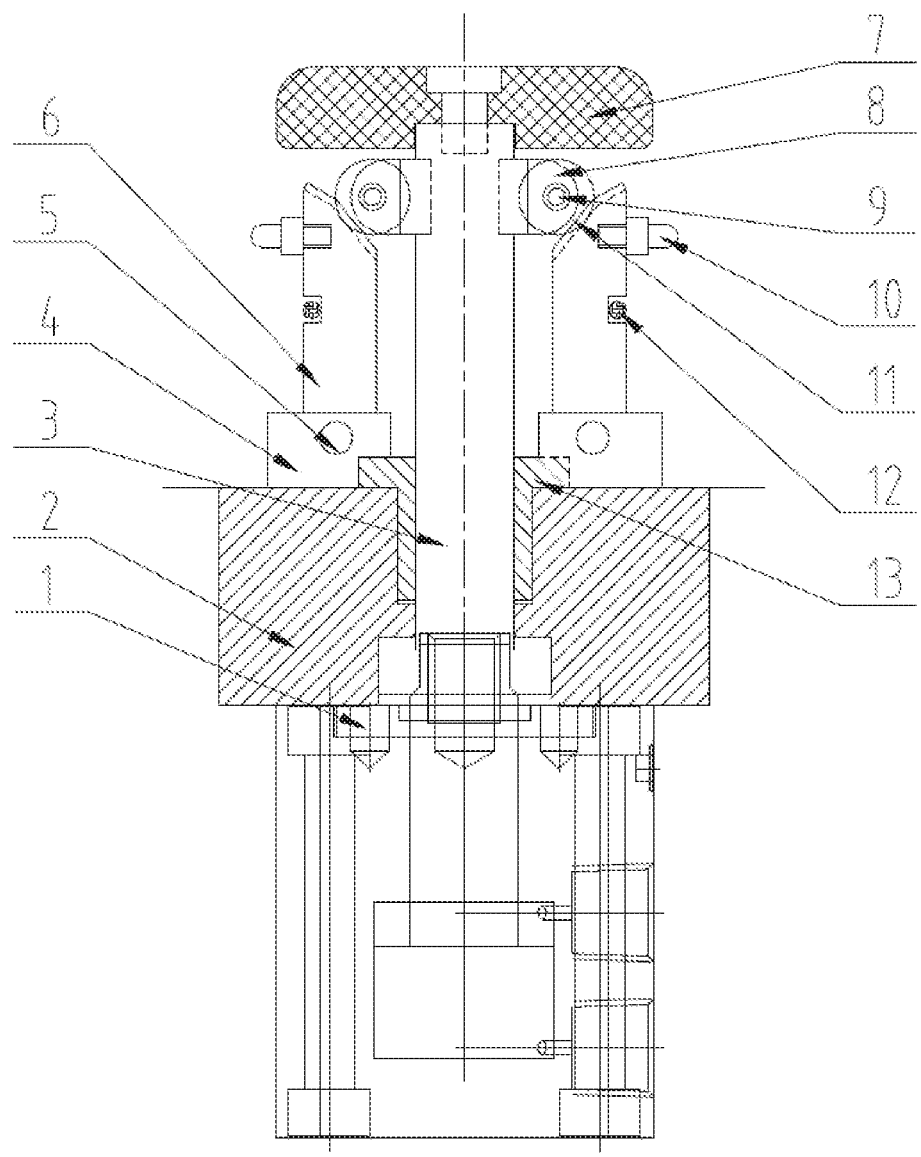
FIG. 8 is a schematic structural view of the tensioning mechanism of the composite wheel assembling device according to the present disclosure.
Figure 9:
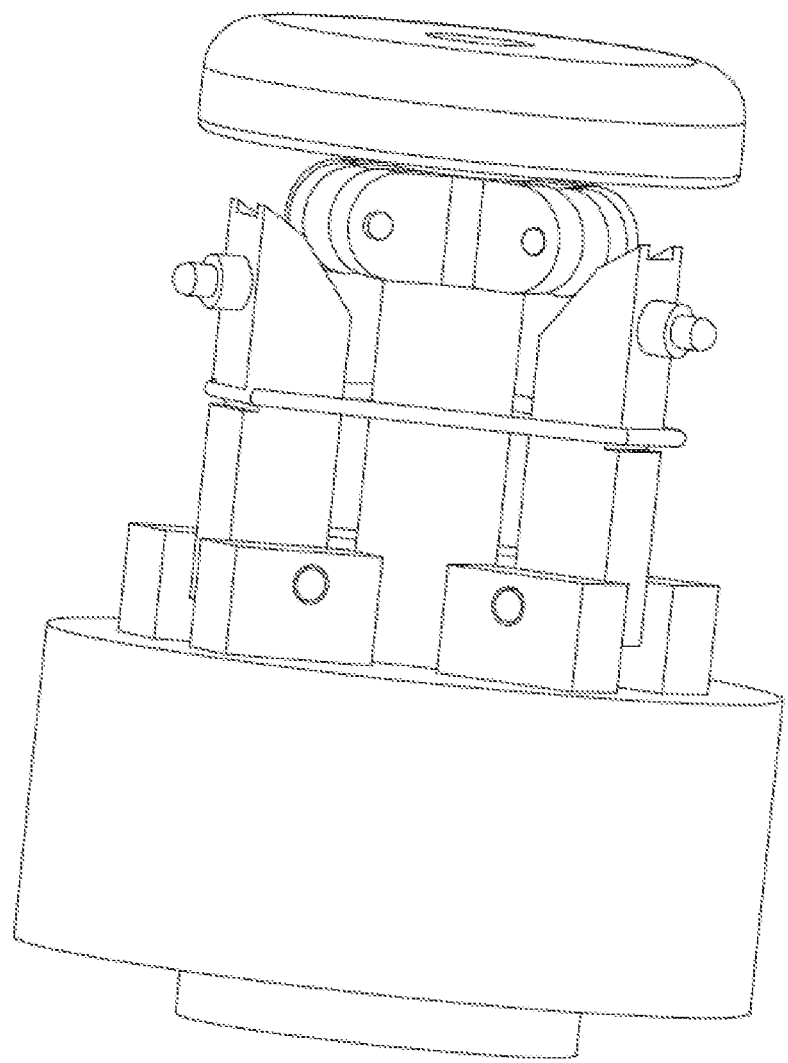
FIG. 9 is a perspective view of the tensioning mechanism of the composite wheel assembling device according to the present disclosure.

A composite wheel assembling device according to an embodiment of the present disclosure will now be described with reference to FIGS. 7-9 in conjunction with the embodiment.

A composite wheel assembling device includes a frame 21, wherein an oil cylinder 1 is fixed on the frame 21; an oil cylinder rod 3 of the oil cylinder 1 penetrates through a base 4 fixed on the frame 21, the first end is fixedly connected with at least three mounting frames 8 uniformly arranged in the circumferential direction; rollers 11 are hinged on the mounting frames 8 through mounting shafts 9; a bracket 6 is hinged at the position corresponding to each roller 11 and on the base 4 through a pin shaft 5, and at least three corresponding brackets 6 are uniformly arranged on the base 4 through the pin shafts 5; the top of each bracket 6 is provided with an arc-shaped inclined plane, wherein the plane is matched with the corresponding roller 11 and the height of the plane gradually reduces from the outside to the inside; the radial outer side surface of each bracket 6 is provided with a contact 10, and at least three uniformly arranged contacts 10 can be driven by the oil cylinder rod 3 to tighten and loosen the central hole of the flange 14 placed on the frame 21 and passes through the bracket 6.

The top of the bracket 6 has two sections of inclined planes with different slopes, and the rollers 11 are contacted with the inclined plane at the top of the bracket 6.

In one embodiment, an elastic belt 12 is further included, the belt tightening the at least three uniformly arranged brackets 6 inwards so that the bracket is contacted with the rollers 11, and the elastic belt 12 being arranged in grooves in the radial outer side surfaces of the brackets 6, under the combined action of the oil cylinder 1 and the elastic belt 12, the oil cylinder rod 3 drives the rollers 11 to move up and down, meanwhile, the rollers 11 roll on the inclined surfaces of the brackets 6, and the brackets 6 drive the contacts 10 to rotate around the pin shafts 5, so that the contacts 10 expand and contract.

In one embodiment, a chassis 2 is fixed on the frame 21, the oil cylinder 1 and the base 4 are both fixed on the chassis 2, the chassis 2 is further fixed with a copper sleeve 13, the oil cylinder 1 is fixed at the lower portion of the chassis 2, the base 4 is fixed at the upper portion of the chassis 2, the copper sleeve 13 is positioned in the middle of the base 4, the oil cylinder rod 3 penetrates through the copper sleeve 13 and the base 4, and the oil cylinder rod 3 can stably move up and down through the matching between the copper sleeve 13 and the oil cylinder rod 3.

In one embodiment, a positioning ring 20 is mounted on the chassis 2, the coaxiality of the positioning ring 20 and the oil cylinder rod 3 is less than 0.05 mm, and this position tolerance is a key factor for ensuring the coaxiality precision of the flange 14 and the positioning ring 20 after the wheel is assembled and is also a key factor for ensuring that the wheel runout is qualified.

In one embodiment, a protection 7 is fixed to the top of the oil cylinder rod 3.

In one embodiment, the flange 14 is placed on the present device, under the action of the oil cylinder 1, the oil cylinder rod 3 overcomes the elasticity of the elastic belt 12 to drive the roller 11 to move downwards, meanwhile, the rollers 11 roll on the inclined surface of the brackets 6, and the brackets 6 drive the contacts 10 to rotate around the pin shafts 5, so that the contacts 10 expands and the center hole of the flange 14 is tensioned.

A series of titanium alloy spokes 15 are mounted in the annular groove 141 in the flange 14 by bolts tightened in threaded holes 142 in the annular groove 141 in the flange 14. Then, the cylinder sleeve 17 is uniformly pressed into the second mounting hole 181 on the side wall of the connecting ring 18, and the connecting ring 18 is placed on the positioning ring 20. Then, a series of locking sleeves 16 is passed through the cylinder sleeve 17, the inner hole spherical surface 171 of the cylinder sleeve 17 is matched with the upper side wall spherical surface 163 of the locking sleeve 16, meanwhile, the inner hole threads of the locking sleeves 16 are meshed with the threaded ends of the titanium alloy spokes 15, the locking sleeves 16 are rotated through a special tool to adjust the tightness of the titanium alloy spokes 15, the flange 14 and the connecting ring 18 are connected into a whole through the titanium alloy spokes 15, and finally the assembled connecting ring 18 is mounted on the carbon fiber rim 21 through bolts 19.

Because the coaxiality of the positioning ring 20 and the expansion core 10 is very high and is less than 0.05 mm, the coaxiality requirement of the flange 14 and the positioning ring 20 after the wheel is assembled is ensured, thereby ensuring the qualified wheel runout.

Then, the oil cylinder 1 drives the rollers 11 to move upwards, the elastic force of the elastic belt 12 enables the contacts 10 to synchronously and centripetally move and be separated from the central hole of the flange 14, and therefore the assembled wheel can be taken down. Thus, the assembling work of the wheel is completed.

Compared with the prior art, the composite wheel assembling device has the following advantages that:

the composite wheel according to the present disclosure has the advantages of high size and shape precision, good dynamic balance, high fatigue strength, good rigidity and elasticity, light weight, attractive appearance and recyclable materials.

The composite wheel assembling device according to the present disclosure meets the requirement of high-precision wheel assembling, meanwhile, has the characteristics of simple structure, convenience in manufacturing and stable performance.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The invention claimed is:

1. A composite wheel, wherein the composite wheel comprises a rim, a connecting ring, a plurality of spokes and a flange all connected in sequence from an outside to an inside in a radial direction of the composite wheel, one end of each spoke of the plurality of spokes being provided with a thread, and another end of each spoke of the plurality of spokes being provided with a first mounting hole, two ring grooves configured to accommodate the first mounting holes are provided in positions adjacent to a first axial surface and a second axial surface and on a radial outer side surface of the flange; threaded holes penetrating through the two ring grooves are uniformly provided in the first axial surface and the second axial surface of the flange corresponding to the two ring grooves, and multiple first mounting holes are inserted into the two ring grooves and connected by bolts passing through the first mounting holes and matching with the threaded holes;

a radial side surface of the connecting ring is uniformly provided with a plurality of through stepped second mounting holes, a radial outside hole diameter of each of the plurality of through stepped second mounting holes is larger than a radial inside hole diameter of each of the plurality of through stepped second mounting holes, a cylinder sleeve is pressed in the plurality of through stepped second mounting holes from an outside to an inside in a radial direction of the connecting ring, the cylinder sleeve is provided with an inner hole spherical surface and a cylindrical surface from an outside to an inside in a radial direction of the cylinder sleeve, the cylinder sleeve is further inserted with a locking sleeve, and the locking sleeve comprises a side wall spherical surface, an outer cylindrical surface and a threaded hole, wherein a radial outer side of the side wall spherical surface is matched with the inner hole spherical surface, the outer cylindrical surface is matched with the cylindrical surface, and the threaded hole is on a radial inside of the locking sleeve and matched with the thread of each spoke of the plurality of spokes;

the rim is fixedly connected to a radial outside of the connection ring.

2. The composite wheel according to claim 1, wherein the radial side surface of the connecting ring is further provided with a first annular protrusion, and a second protrusion corresponding to the first annular protrusion is provided on a radial inner side surface of the rim, the first annular protrusion and the second protrusion being both provided with axial threaded through holes and are fixedly connected through a bolt.

3. The composite wheel according to claim 1, wherein the threaded holes are symmetrically disposed on both the first axial surface and lower the second axial surface of the flange.

4. The composite wheel according to claim 1, wherein a material of the rim comprises carbon fibers and a material of the plurality of spokes comprises a titanium alloy.

* * * * *